March 31, 1925.

J. B. HOWE 1,531,483

SCALE PAN ADJUSTING MEANS FOR CARD FEEDERS

Filed July 24, 1922

Inventor:
Joseph B. Howe,
by Roberts, Roberts & Cushman
Attys.

Patented Mar. 31, 1925.

1,531,483

UNITED STATES PATENT OFFICE.

JOSEPH B. HOWE, OF WORCESTER, MASSACHUSETTS, ASSIGNOR TO GEORGE S. HARWOOD & SON, OF BOSTON, MASSACHUSETTS, A COPARTNERSHIP CONSISTING OF SYDNEY HARWOOD AND JOHN H. HARWOOD.

SCALE-PAN-ADJUSTING MEANS FOR CARD FEEDERS.

Application filed July 24, 1922. Serial No. 577,008.

*To all whom it may concern:*

Be it known that I, JOSEPH B. HOWE, a citizen of United States, and resident of Worcester, in the county of Worcester and State of Massachusetts, have invented new and useful Improvements in Scale-Pan-Adjusting Means for Card Feeders, of which the following is a specification.

This invention relates to textile machinery and more particularly to card feeding mechanism of that type wherein a double fulcrumed scale pan is employed as an element of the mechanism for automatically weighing out predetermined quantities of fibre. Accuracy in operation is a prime requisite in such mechanism and to insure great delicacy of action it is necessary to support the scale pan upon a knife edge fulcrum but as the pan is usually built up from several parts and has various attachments and appendages, it is practically impossible to predetermine the point at which the pan will balance about such a fulcrum.

The object of the present invention is accordingly to provide simple and readily accessible means permitting adjustment of a scale pan upon a knife edge fulcrum for bringing the pan into proper balancing relation thereto and also capable of retaining the pan in such adjusted position without imposing any substantial restraint upon the movement of the pan as it swings about the knife edge of the fulcrum.

In the accompanying drawings a preferred embodiment of the invention is illustrated by way of example, and in such drawings.

Figure 1:
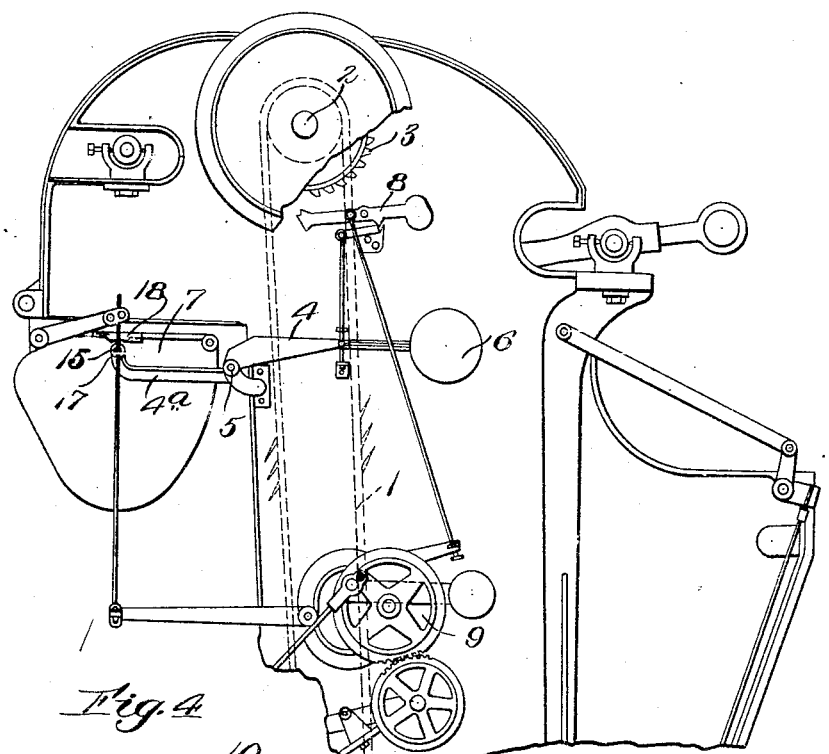
Fig. 1 is a fragmentary, end elevation of a card feeder of well known type, showing the present invention as applied thereto.

Referring to the drawings there is shown in Fig. 1 the upper portion of the right hand end of a card feeder of the type illustrated in the Bramwell Patent No. 216,474, June 10, 1879. This machine comprises a spike apron 1 constituting means for elevating fibre, such spike apron being driven by means of a shaft 2. The operation of this shaft is controlled by a clutch indicated generally at 3. The machine is also provided with an automatic weighing device comprising a scale beam having the rear arm 4 and the forward arm $4^a$, such beam being fulcrumed intermediate its ends at the point 5. The rear arm 4 is provided with a counterbalance 6 while a scale pan 7 is fulcrumed upon the forward end of the arm $4^a$. A clutch controlling lever 8 is suitably connected to the rear arm 4 of the scale beam so that as the scale beam tips under the action of a load in the scale pan, the engaging elements of the clutch are disconnected and the shaft 2 is stopped. At 9 there is indicated mechanism of known type adapted at the proper time to restart the shaft 2 and restore the emptied scale pan to normal position for receiving fibre from the elevating means. It is to be understood that a scale beam of the type herein disclosed is employed at opposite sides of the machine and that the scale pan is supported at its opposite ends upon the forward arms of the respective scale beams.

Figure 4:
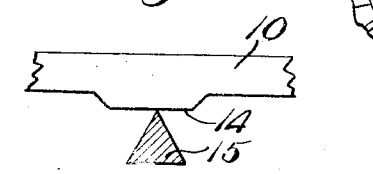
Fig. 4 is a fragmentary end elevation showing one end of the scale pan fulcrum, but with the retaining device omitted.
Figure 2:
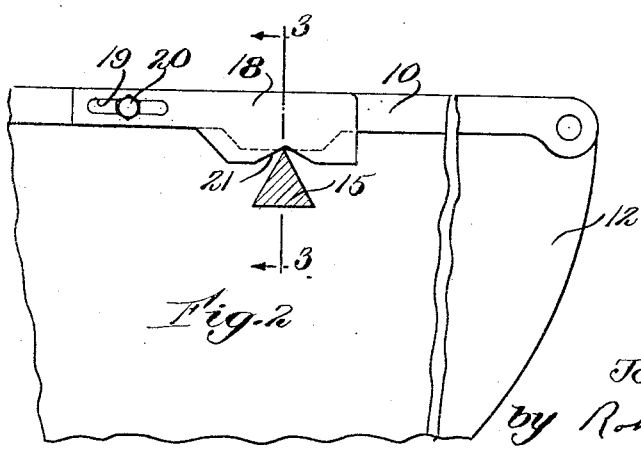
Fig. 2 is a fragmentary, end elevation to large scale, showing the scale pan and fulcrum.
Figure 3:
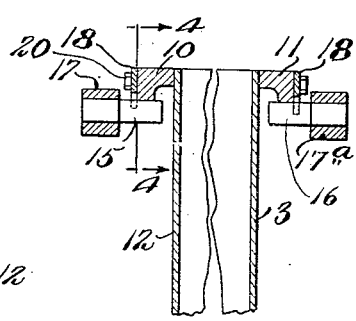
Fig. 3 is a fragmentary, vertical cross-section longitudinally of the scale pan on a line such as III—III of Fig. 2, showing details of the scale pan fulcrums and the retaining device of the present invention.

The scale pan preferably comprises the end bars 10, 11 (Fig. 3) respectively to which are secured the end walls 12, 13. The under side of each of the bars 10, 11 comprises a substantially flat, elongate supporting surface 14 (Fig. 4), such surfaces being at the central parts of the respective bars and resting upon the apices of knife edge fulcrums 15, 16 respectively. These fulcrums are preferably of triangular cross section and are secured in bosses 17, 17ᵃ at the forward ends of the arms 4ᵃ of the respective scale beams. As thus arranged the scale pan is free to tilt about the axis provided by the knife edges of the fulcrums and it is clear that the scale pan may be adjusted to proper balance by shifting it bodily with respect to such knife edges, the flat and elongate surfaces 14 permitting substantial movement of the scale pan for this purpose.

A plate such as 18 is secured to each of the end bars 10, 11 respectively, these plates being provided with elongate slots 19 for the reception of bolts such as 20 having screw threaded engagement with openings in the respective bars 10, 11. The plates 18 may thus be adjusted longitudinally of the bars to which they are connected. The plates 18 have portions somewhat wider than the bars 10, 11 and are provided at their lower edges with notches 21 preferably of V form which take over the respective fulcrum members 15, 16. These notches are of such depth that the plates 18 do not bear upon the fulcrum members and preferably have angles somewhat greater than the angle at the bearing apices of the fulcrum members. The plates 18 thus do not in any manner interfere with the free tilting of the scale pan about its fulcrum points but serve to prevent any substantial bodily movement of the scale pan with respect to such points. When it is desired to adjust the balance of the scale pan, the bolts 20 are loosened permitting the plates 18 to slide relatively to the end bars 10 and 11. The scale pan is then shifted until it balances with the desired accuracy about its fulcrum points and then the bolts 20 are tightened, thus preventing accidental displacement of the scale pan during use.

While the retaining device has herein been shown in the form of a plate, it is evident that other and equivalent means may well be employed for securing the desired result, providing such means does not substantially interfere with the free balancing of the scale pan about its fulcrum, and providing such means be of a character such as to prevent accidental displacement of the scale pan while permitting adjustment of the scale pan for balancing it at will.

I claim:

1. In combination with a scale pan for card feeding machines, a fulcrum on which the scale pan is adjustably supported, and means to retain the scale pan in adjusted position on the fulcrum while permitting free oscillation of the scale pan on the fulcrum.

2. In combination with a scale pan for card feeding machines, said pan having an elongate substantially straight supporting surface, a knife edge fulcrum engaging said surface, and adjustable means for preventing bodily movement of the scale pan relative to the knife edge.

3. In combination with a scale pan for card feeding machines, fulcrum means for the pan, the pan being constructed and arranged for bodily adjustment relatively to such fulcrum means whereby to permit initial balancing of the pan, and retaining means carried by the pan comprising a part partially embracing the fulcrum means but normally free from engagement therewith for preventing accidental bodily displacement of the pan after adjustment.

4. In combination with a scale pan for card feeding machines, said pan having an end bar having a substantially straight and elongate under surface, a knife edge fulcrum engaging said surface, and a retainer device secured to the bar and provided with a notch loosely engaging the fulcrum to prevent accidental longitudinal movement of the bar relative to the fulcrum.

5. In combination with a scale pan for card feeding machines, said pan having a substantially flat, fulcrum engaging surface, a knife edge fulcrum engaging said surface, and a plate adjustably secured to the outer surface of the pan and having a notch in its edge, the notch partially embracing the fulcrum whereby to prevent accidental bodily displacement of the pan relatively to the fulcrum.

6. In combination with an elongate scale pan for card feeding machines, said pan comprising end members each provided with a flat supporting surface, a fulcrum of substantially triangular cross section engaging each of said supporting surfaces, and a plate adjustably secured to one end of said pan and having a V notch in its lower edge, said notch loosely engaging the adjacent fulcrum and serving to prevent accidental bodily displacement of the pan relatively to the fulcrum.

7. In combination, a scale pan for card feeding machines comprising a supporting bar at each of its ends provided with a flat under surface, a triangular member constituting a knife edge fulcrum engaging each of said surfaces, and a member adjustably secured to the outer surface of each of said supporting bars and provided with a V notch loosely engaging the respective fulcrum members and serving to prevent accidental bodily displacement of the scale pan relatively to its fulcrums.

8. In combination an elongate scale pan for card feeding machines, fulcrum means for the pan comprising oppositely directed triangular members constituting knife edges, said members engaging flat supporting elements at opposite ends of the pan respectively, and a plate adjustably secured to each end of the pan, said plates having V notches in their lower edges engageable with the respective fulcrums, the angle of said notches being greater than that of the knife edges.

9. A scale pan having spaced supporting bars, each bar being provided with an elongate flat bearing surface, a knife-edge fulcrum engaging each of said surfaces, and adjustable keepers carried by the pan normally free from engagement with the respective fulcrums constructed and arranged to prevent accidental displacement of the pan relatively to the knife edges.

Signed by me at Boston, Mass., this 19th day of July 1922.

JOSEPH B. HOWE.